(12) United States Patent
Aluru et al.

(10) Patent No.: US 11,451,721 B2
(45) Date of Patent: Sep. 20, 2022

(54) INTERACTIVE AUGMENTED REALITY (AR) BASED VIDEO CREATION FROM EXISTING VIDEO

(71) Applicant: Soul Vision Creations Private Limited, Bangalore (IN)

(72) Inventors: Sravanth Aluru, Bangalore (IN); Gaurav Baid, Bangalore (IN); Sarbartha Sengupta, Bangalore (IN)

(73) Assignee: Soul Vision Creations Private Limited, Bangalore (IN)

( * ) Notice: Subject to any disclaimer, the term of this patent is extended or adjusted under 35 U.S.C. 154(b) by 42 days.

(21) Appl. No.: 17/009,498

(22) Filed: Sep. 1, 2020

(65) Prior Publication Data

US 2021/0084241 A1 Mar. 18, 2021

(30) Foreign Application Priority Data

Sep. 3, 2019 (IN) .............................. 201941035434

(51) Int. Cl.
*H04N 5/275* (2006.01)
*G06T 19/00* (2011.01)
(Continued)

(52) U.S. Cl.
CPC ........... *H04N 5/275* (2013.01); *G06T 19/006* (2013.01); *G06V 20/46* (2022.01); *G06V 20/49* (2022.01)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 6,912,310 B1 6/2005 Park et al.
8,744,125 B2 6/2014 Zhu et al.
(Continued)

FOREIGN PATENT DOCUMENTS

CN 103929653 A 7/2014
CN 106250863 A 12/2016

OTHER PUBLICATIONS

Hu et al., "Motion-Guided Cascaded Refinement Network for Video Object Segmentation," IEEE Transactions Pattern Anal Mach Intell, Aug. 2020, 9 pp.
(Continued)

*Primary Examiner* — Todd Buttram
(74) *Attorney, Agent, or Firm* — Shumaker & Sieffert, P.A.

(57) ABSTRACT

This disclosure describes a method including determining one or more object clusters from a plurality of frames of the video content. At least one of the one or more object clusters is an object cluster with movement through the plurality of frames. The method includes extracting the determined one or more object clusters from the plurality of frames to generate a set of frames having extracted one or more object clusters and outputting the set of frames having extracted one or more object clusters. This disclosure describes a method including receiving the set of frames having the extracted one or more object clusters, rendering one or more of the set of frames in a live camera feed of a device, and generating video content based on the rendered one or more set of frames and a user interacting with the extracted one or more object clusters.

17 Claims, 7 Drawing Sheets

(51) Int. Cl.
*G06K 9/00* (2022.01)
*G06V 20/40* (2022.01)

(58) Field of Classification Search
CPC .... G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | |
|---|---|---|
| 10,002,313 B2 | 6/2018 | Vaca Castano et al. |
| 10,297,085 B2 | 5/2019 | Anderson |
| 2015/0293651 A1* | 10/2015 | Han .................... G06F 3/04817 715/835 |
| 2016/0180590 A1 | 6/2016 | Kamhi et al. |
| 2017/0193686 A1* | 7/2017 | Mullins ................... G06T 17/00 |
| 2019/0205649 A1 | 7/2019 | Ananthanarayanan et al. |
| 2021/0084241 A1* | 3/2021 | Aluru ................. G06K 9/00711 |

OTHER PUBLICATIONS

Yao et al., "Video object segmentation and tracking: A survey," arXiv:1904.09172v3, Apr. 26, 2019, 39 pp.

Sarmila et al., "Hybrid segmentation method for malignancy detection using fuzzy-C-means and active contour model," International Journal of Engineering Inventions, ISSN: 2278-7461, vol. 1, Issue 11, Dec. 2012, 8 pp.

Yang et al., "Object contour detection with a fully convolutional encoder-decoder network," arXiv:1603.04530v1, Mar. 15, 2016, 10 pp.

International Search Report and Written Opinion of International Application No. PCT/IN2020/050769, dated Dec. 17, 2020, 9 pp.

* cited by examiner

INTERACTIVE AUGMENTED REALITY (AR) BASED VIDEO CREATION FROM EXISTING VIDEO

This Application claims the benefit of Indian Provisional Patent Application 201941035434 filed on Sep. 3, 2019, the entire content of which is hereby incorporated by reference.

TECHNICAL FIELD

The disclosure relates to video content processing.

BACKGROUND

Brand campaigns are driven by creative photo and video shoots providing an aspirational social experience for their consumers. While videos are known to drive better engagement, videos only provide for static viewership and lack user interactivity and personalization.

SUMMARY

In general, the disclosure describes example techniques of processing video content to extract object clusters (e.g., important object clusters (IOCs)) from frames of video content in a way to maintain movement of the object clusters through the frames. For example, the extracted object clusters form a set of frames that capture the movement of the object clusters in the original (i.e., pre-extracted) frames of video content. The extracted object clusters may be less the content of the original frames of the video content. In some examples, the extracted object clusters may be a video rendering of a real-life object or person. In general, an object cluster may be an item or person that is recognized as a discrete item or a complete real-life representation of the person. In some examples, the object cluster may be more than a shell or stick figure but rather the actual representation of the person including facial and body features.

A server may extract and store the set of frames having the extracted object clusters for outputting to a computing device. In some examples, the computing device may be configured to extract the object clusters to generate the set of frames having the extracted object clusters. In both examples, the computing device may render one or more of the set of frames in a live camera feed of a device. In some examples described in this disclosure, the computing device may generate video content based on the rendered one or more frames and a user interacting with the extracted one or more object clusters. For example, the computing device may display, as part of the live camera feed, the rendered one or more set of frames and the user interacting with the extracted one or more object clusters. As another example, the computing device may generate a recording of the rendered one or more set of frames and the user interacting with the extracted one or more object clusters.

This disclosure describes example techniques rooted in technology that provide practical applications related to processing video content. For example, the example techniques may be based on processing circuitry configured to extract the object clusters and computing devices configured to process and render the object clusters in a way that maintains the movement of the object clusters rather than using a static image of an object cluster.

In one example, the disclosure describes a method of processing video content, the method comprising receiving a set of frames having extracted one or more object clusters, wherein the one or more object clusters are extracted from a plurality of frames, wherein at least one of the one or more object clusters is an object cluster with movement through the plurality of frames, rendering one or more of the set of frames in a live camera feed of a device, and generating video content based on the rendered one or more set of frames and a user interacting with the extracted one or more object clusters.

In one example, the disclosure describes a device for processing video content, the device comprising a memory configured to store a set of frames having extracted one or more object clusters and processing circuitry, coupled to the memory, and configured to receive a set of frames having extracted one or more object clusters, wherein the one or more object clusters are extracted from a plurality of frames, wherein at least one of the one or more object clusters is an object cluster with movement through the plurality of frames, render one or more of the set of frames in a live camera feed of a device, and generate video content based on the rendered one or more set of frames and a user interacting with the extracted one or more object clusters.

In one example, the disclosure describes a computer-readable storage medium storing instructions thereon that when executed cause one or more processors to receive a set of frames having extracted one or more object clusters, wherein the one or more object clusters are extracted from a plurality of frames, wherein at least one of the one or more object clusters is an object cluster with movement through the plurality of frames, render one or more of the set of frames in a live camera feed of a device, and generate video content based on the rendered one or more set of frames and a user interacting with the extracted one or more object clusters.

The details of one or more examples are set forth in the accompanying drawings and the description below. Other features, objects, and advantages will be apparent from the description and drawings, and from the claims.

DETAILED DESCRIPTION

Figure 1:
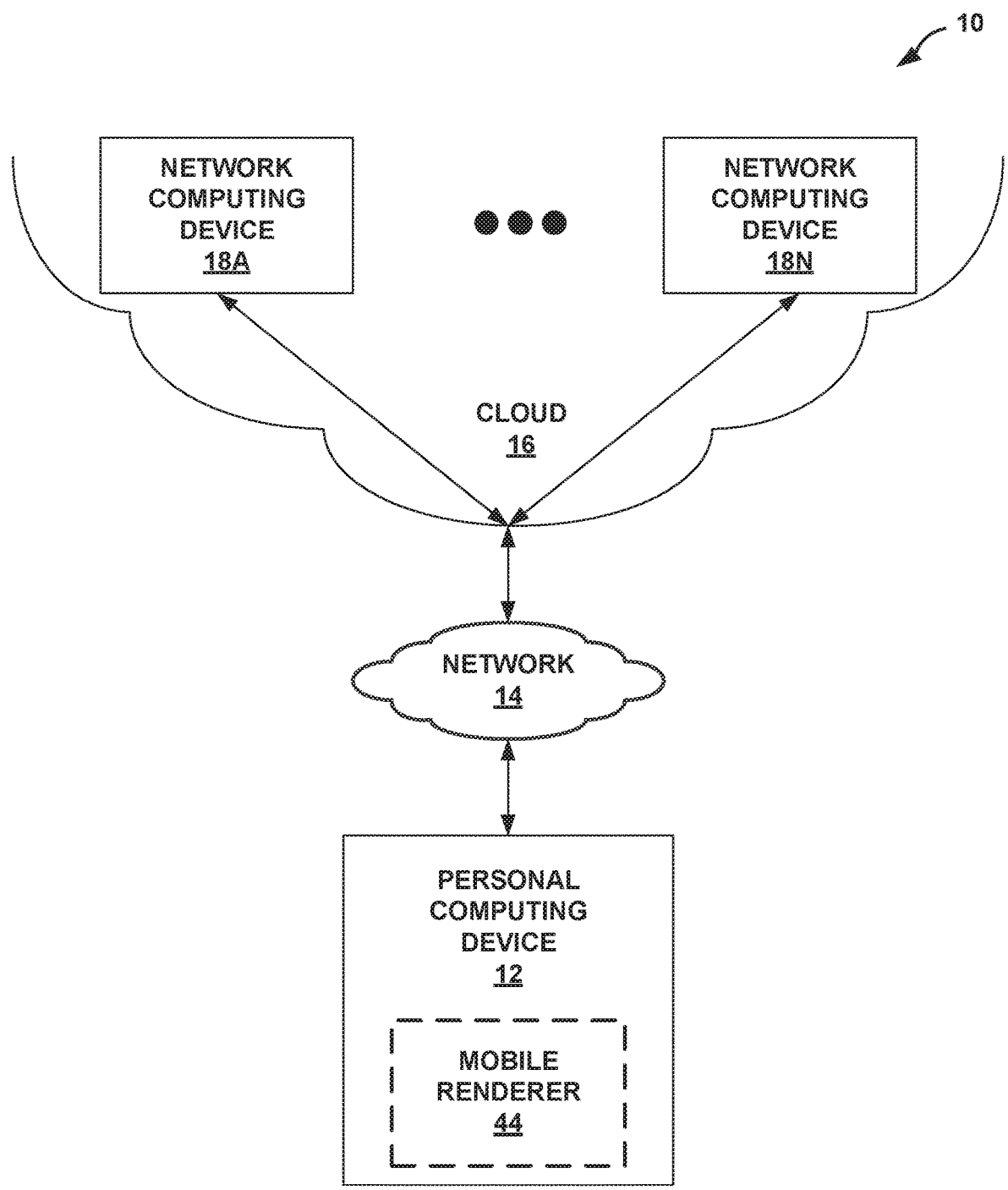
FIG. 1 is a block diagram illustrating a system for processing video content in accordance with one or more example techniques described in this disclosure.

This disclosure describes example techniques that may provide interactive and real-time video creation for digital users. The example techniques may be useable in a variety of ways and for different purposes. For ease of description only, the example techniques are described with respect to digital brands, but the techniques should not be considered limited to digital brands.

Many digital brands use digital ad campaigns based on photo and video shoots. This disclosure describes example techniques to leverage video processing techniques to allow for user interactivity and personalization of the video content to drive better engagement.

As described in more detail, for video shoot campaigns, a computing device may extract Important Object Clusters ("IOCs") from frames of the video content. Examples of IOCs or object clusters, more generally, include an item or person that is recognized as a discrete item or a complete real-life representation of the person. In some examples, the object cluster may be more than a shell or stick figure but rather the actual representation of the person including facial and body features. The object clusters may be associated with movement through the frames of the video content. For example, an object cluster may be a celebrity, and the frames of the video content may include a video sequence of the celebrity dancing.

In one or more examples, the computing device may extract the one or more object clusters from the video content to generate a set of frames having the extracted object clusters. For example, the computing device may extract a celebrity dancing from campaign video footage of a brand to generate a set of frames having the celebrity dancing.

The computing device (e.g., a receiving computing device) may render the set of frames having the object clusters for display and/or recording. For example, the receiving computing device may place the IOC (e.g., virtual IOC) for rendering into a live camera feed of the computing device (e.g., such as in an augmented reality (AR) environment in world space). This may allow the user of the receiving computing device to personalize videos in real-time with themselves interacting with the IOC.

Moreover, the digital consumption is slowly shifting to influencer-led social discovery where social influencers push editorial/paid brand content to their followers. The example techniques described in this disclosure may allow for the influencer or celebrity to personalize their campaigns with their own life-size virtual renders (e.g., IOCs) that the users can interact with and drive organic video shares.

As described above, the example techniques described in this disclosure may be usable for a variety of purposes. In general, the example techniques may be applicable to two-dimensional (2D) video digital disclosure, ad and commerce markets, and provides a scalable approach to shift consumer experience from static passive viewership to interactive and personalized real-time user generated video engagement. Also, the example techniques described in this disclosure may provide approaches to engage consumers where the consumers can create user generated videos (e.g., where the campaign content is built in for word-of-mouth awareness) and share to their social circles thereby driving valuable organic growth for the brand. As another example, the example techniques may be used for providing training or showcasing product application demonstrations to the users with the help of interactive video content generated out of the IOCs.

While there are many application contexts, driven by the diverse nature of existing 2D video shoot campaign themes, the following is a non-exhaustive list of sample applications to drive first-to-market consumer experiences. As one example, for interactive celebrity and influencer campaigns, the example techniques may be used to extract out aspirational celebrity sequences from campaign footage and allow users to create personalized videos with themselves interacting with the celebrity. As another example, user contests where multiple such experiences covering various user contexts (e.g., dance, comedy, drama, etc.) are offered to users to select their preferred interactive video and participate by submitting their own personalized video. These experiences can be offered across web, mobile and social platforms.

FIG. 1 is a block diagram illustrating a system 10 for processing video content in accordance with one or more example techniques described in this disclosure. As illustrated, system 10 includes personal computing device 12, network 14, and cloud 16. Cloud 16 includes network computing devices 18A-18N (collectively referred to as "network computing devices 18"). As described in more detail, FIG. 1 illustrates an example system 10 that enables users to interact with object clusters of an existing video in a camera augmented reality (AR) friendly environment.

Examples of personal computing device 12 include mobile computing devices (e.g., tablets or smartphones), laptop or desktop computers, e-book readers, digital cameras, video gaming devices, and the like. In one or more examples, a user of personal computing device 12 may access video content such as video content of an influencer or a brand. For example, network computing devices 18A-18N in cloud 16 may store video content from different brands or influencers for the user of personal computing device 12 to access and view.

As illustrated, network computing devices 18 are within cloud 16. Cloud 16 represents a cloud infrastructure that supports multiple network computing devices 18 on which applications or operations requested by one or more users run. For example, cloud 16 provides cloud computing for using network computing devices 18, hosted on network 14, to store, manage, and process data.

Network 14 may transport data between network computing devices 18 of cloud 16 and personal computing device 12. For example, network 14 may form part a packet-based network, such as a local area network, a wide-area network, or a global network such as the Internet. Network 14 may include routers, switches, base stations, or any other equipment that may be useful to facilitate data between personal computing device 12 and network computing devices 18.

Examples of network computing devices 18 include server devices and/or storage devices. As one example, network computing devices 18 may be computing servers, but the example techniques are not so limited. Network computing devices 18 may be a combination of computing servers, web servers, database servers, and the like.

In accordance with one or more example techniques described in this disclosure, processing circuitry of one or more of network computing devices 18 may execute an application that causes processing circuitry to extract object clusters from frames of video content stored on one or more network computing devices 18. In some examples, it may be possible that one or more network computing devices 18 may output the frames of video content to personal computing device 12, and personal computing device 12 may be configured to extract object clusters from frames of video content.

Accordingly, the example techniques described with respect to processing circuitry performing example techniques may be performed by processing circuitry of one or more of network computing devices 18, processing circuitry of personal computing device 12, or a combination of processing circuitry of network computing devices 18 and personal computing device 12. For ease of understanding, some operations are described with respect to network computing devices 18, and some operations are described with respect to personal computing device 12. However, the example techniques should not be considered so limiting.

In some examples, processing circuitry (e.g., of network computing devices 18 or personal computing device 12) may determine one or more object clusters (e.g., important object clusters (IOCs)) from a plurality of frames of video content (e.g., stored on network computing devices 18 or personal computing device 12). At least one of the one or more object clusters is an object cluster with movement through the plurality of frames (e.g., video content of a celebrity dancing). The processing circuitry may be configured to extract the determined one or more object clusters from the plurality of frames to generate a set of frames having extracted one or more object clusters. The processing circuitry may store the set of frames having the extracted one or more object clusters and output the set of frames having the extracted one or more object clusters (e.g., to personal computing device 12).

In some examples, processing circuitry (e.g., of personal computing device 12) may receive a set of frames having extracted one or more object clusters. In one or more examples, the one or more object clusters are extracted from a plurality of frames, and at least one of the one or more object clusters is an object cluster with movement through the plurality of frames. The processing circuitry may render one or more of the set of frames in a live camera feed of a device and generate video content based on the rendered one or more set of frames and a user interacting with the extracted one or more object clusters.

It may be possible that personal computing device 12 outputs video content that includes the user to network computing devices 18. Processing circuitry of network computing devices 18 may render one or more of the set of frames having the extracted one or more object clusters and generate the video content based on the rendered one or more set of frames and a user interacting with the extracted one or more object clusters. Processing circuitry of network computing devices 18 may output the generated video content back to personal computing device 12 for display to the user.

As illustrated, personal computing device 12 may execute mobile renderer 44. In response to executing mobile renderer 44, network computing devices 18 and personal computing device 12 may perform the example techniques described in this disclosure. For example, after executing mobile renderer 44, personal computing device 12 may request for the set of frames having the extracted one or more object clusters from network computing devices 18. For example, the user of personal computing device 12, interacting with mobile renderer 44, may request for a particular object cluster from frames of video content (e.g., particular celebrity from a video). In some examples, network computing devices 18 may have already stored the extracted one or more object clusters requested by the user via mobile renderer 44 (e.g., such as for frequently requested content). In some examples, network computing devices 18 may dynamically generate the set of frames having the extracted one or more object clusters (e.g., where network computing devices 18 do not already store the extracted one or more object clusters).

Figure 2:
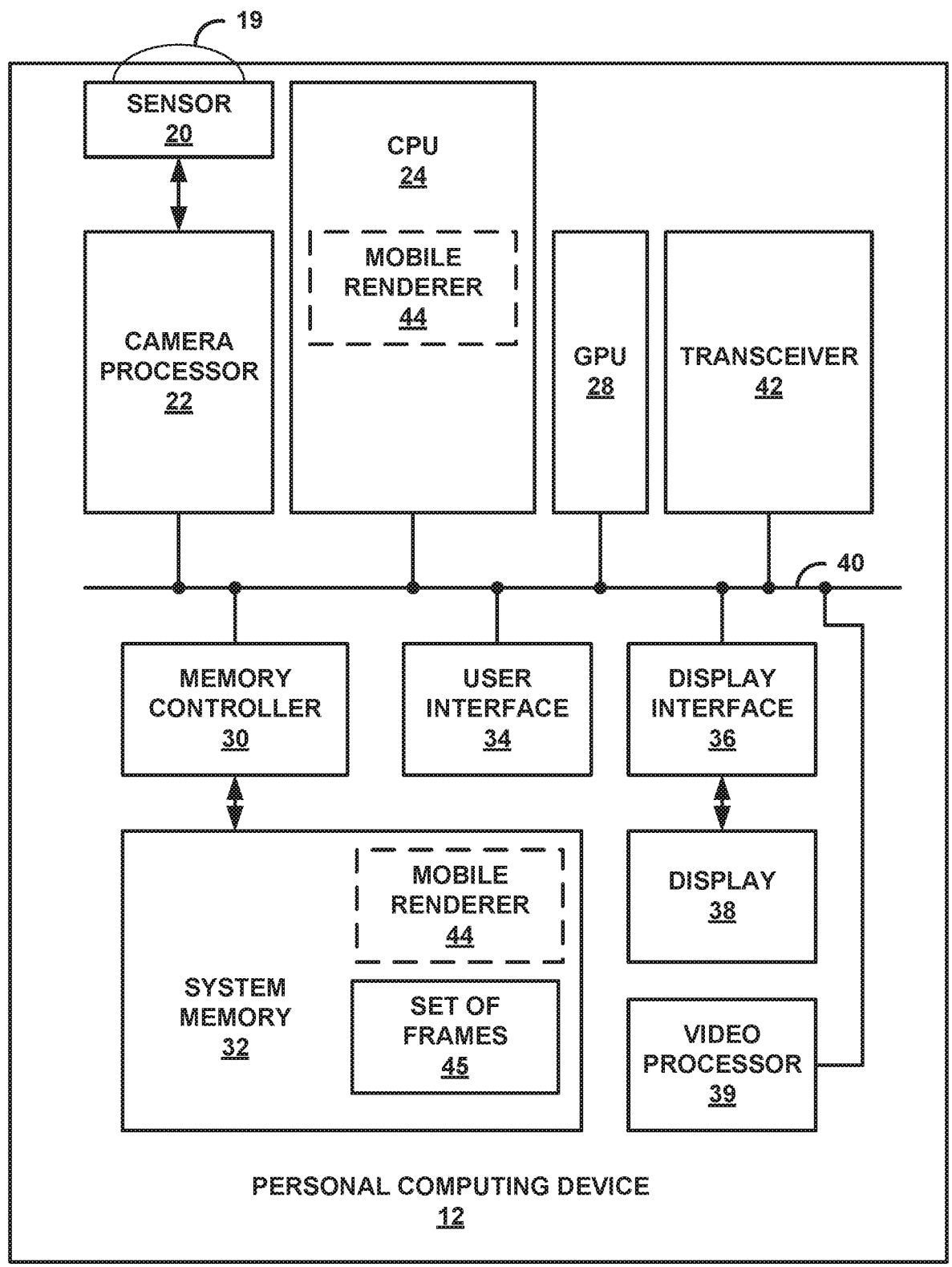
FIG. 2 is a block diagram illustrating an example of a personal computing device configured to render object clusters in accordance with one or more example techniques described in this disclosure.

FIG. 2 is a block diagram illustrating an example of a personal computing device configured to render object clusters in accordance with one or more example techniques described in this disclosure. Examples of personal computing device 12 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of person computing device 12 include a personal music player, a video player, a display device, a camera, a television, or any other type of device that processes and/or displays graphical data.

As illustrated in the example of FIG. 2, personal computing device 12 includes lens 19 coupled to sensor 20, camera processor 22, a central processing unit (CPU) 24, a graphical processing unit (GPU) 28, memory controller 30 that provides access to system memory 32, user interface 34, display interface 36 that outputs signals that cause graphical data to be displayed on display 38, and video processor 39. Personal computing device 12 also includes transceiver 42, which may include wired or wireless communication links, to communicate with network 14 of FIG. 1. Although FIG. 2 illustrates lens 19 as part of the same device that includes GPU 28, the techniques described in this disclosure are not so limited. Moreover, the shape and configuration of lens 19 is illustrated as one example, and should not be considered limiting.

Also, although the various components are illustrated as separate components, in some examples the components may be combined to form a system on chip (SoC). As an example, camera processor 22, CPU 24, GPU 28, display interface 36, and video processor 39 may be formed on a common integrated circuit (IC) chip. In some examples, one or more of camera processor 22, CPU 24, GPU 28, display interface 36, and video processor 39 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

Camera processor 22 is configured to receive the electrical currents as sensor signals from respective pixels of sensor 20 and process the electrical currents to generate pixel data of images. In some examples, camera processor 22 may be configured as a single-input-multiple-data (SIMD) architecture. Camera processor 22 may perform the same operations on current received from each of the pixels on sensor 20. Each lane of the SIMD architecture may include an image pipeline. The image pipeline includes hardwire circuitry and/or programmable circuitry (e.g., at least one of fixed-function or programmable circuitry) to process the output of the pixels.

Camera processor 22 outputs the resulting images (e.g., pixel values for each of the image pixels) to system memory 32 via memory controller 30. In some examples, such as in live camera feed mode, camera processor 22 may output the resulting images for display on display 38. For instance, in live camera feed mode, a user may be looking at display 38 to see what a final picture or video will look like.

CPU 24 may be a general-purpose or a special-purpose processor that controls operation of personal computing device 12. A user may provide input to personal computing device 12 to cause CPU 24 to execute one or more software applications. The software applications that execute on CPU 24 may include, for example, mobile renderer 44. In the example of FIG. 2, CPU 24 is configured to execute mobile renderer 44. However, in other applications, GPU 28 or other processing circuitry may be configured to execute mobile renderer 44.

A user may provide input to personal computing device 12 via one or more input devices (not shown) such as a keyboard, a mouse, a microphone, touchscreen, a touch pad or another input device that is coupled to personal computing device 12 via user interface 34. In some examples, such as where personal computing device 12 is a mobile device (e.g., smartphone or tablet), user interface 34 may be part of display 38.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 12. For instance, display 38 may be a screen of a mobile telephone handset or a tablet computer. Alternatively, display 38 may be a stand-alone device coupled to personal computing device 12 via a wired or wireless communications link. For instance, display 38 may be a computer monitor or flat panel display connected to a personal computer via a cable or wireless link.

Camera processor 22, CPU 24, GPU 28, and video processor 39 may store image data, and the like in respective buffers that are allocated within system memory 32. Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

For ease of description, one or more examples are described with user interface 34 being part of display 38 (e.g., where display 38 is a touchscreen). However, the example techniques should not be considered limited to such examples.

Memory controller 30 facilitates the transfer of data going into and out of system memory 32. For example, memory controller 30 may receive memory read and write commands, and service such commands with respect to memory 32 in order to provide memory services for the components in personal computing device 12. Memory controller 30 is communicatively coupled to system memory 32. Although memory controller 30 is illustrated in the example of personal computing device 12 of FIG. 2 as being a processing circuit that is separate from both CPU 24 and system memory 32, in other examples, some or all of the functionality of memory controller 30 may be implemented on one or both of CPU 24 and system memory 32.

System memory 32 may store program modules and/or instructions and/or data that are accessible by camera processor 22, CPU 24, GPU 28, and video processor 39. For example, system memory 32 may store user applications (e.g., mobile renderer 44), resulting images from camera processor 22, rendered image content from GPU 28, rendered video content from video processor 39, etc. System memory 32 may additionally store information for use by and/or generated by other components of personal computing device 12. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause camera processor 22, CPU 24, GPU 28, display interface 36, and video processor 39 to perform the functions ascribed to these components in this disclosure. Accordingly, system memory 32 may be a computer-readable storage medium having instructions stored thereon that, when executed, cause one or more processors (e.g., camera processor 22, CPU 24, GPU 28, display interface 36, and video processor 39) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 12, and moved to another device. As another example, memory, substantially similar to system memory 32, may be inserted into personal computing device 12. In certain examples, a non-transitory storage medium may store data that can, over time, change (e.g., in RAM).

As illustrated, one example of the software application that CPU 24 executes is mobile renderer 44. In response to executing mobile renderer 44, CPU 24 may cause transceiver 42 to output a request for a set of frames having extracted one or more object clusters. In some examples, CPU 24 may receive the video content and perform the extraction of the one or more object clusters.

Video processor 39 may be configured to reconstruct the set of frames having the one or more object clusters and store the result of the reconstruction as set of frames 45 in system memory 32. In some examples, CPU 24 may cause display 38 to display one or more frames of set of frames 45, where set of frames 45 include the extracted one or more object clusters. In this way, video processor 39 may render one or more of the set of frames having the extracted one or more object clusters. In some examples, CPU 24 may cause video processor 39 to render one or more of the set of frames having the extracted one or more object clusters in a live camera feed of personal computing device 12. In some examples, GPU 28 may be configured to render one or more of the set of frames having the extracted one or more object clusters. For example, GPU 28 may retrieve set of frames 45 and render set of frames 45 for display. In such examples, CPU 24 may cause GPU 28 to render one or more of the set of frames having the extracted one or more object clusters in a live camera feed of personal computing device 12

Personal computing device 12 may generate video content based on the rendered one or more set of frames and a user interacting with the extracted one or more object clusters. As one example, CPU 24 may cause display 38 to display, as part of the live camera feed of the device, the rendered one or more set of frames and the user interacting with the extracted one or more object clusters. As another example, CPU 24 may generate a recording of the rendered one or more set of frames and the user interacting with the extracted one or more object clusters for storage in system memory 32. In both examples, the result may be video where the user appears to be interacting with the one or more object clusters.

For example, in an augmented reality (AR) environment, the video content (e.g., in live camera feed mode or as stored) would appear with the object clusters moving in the AR environment but appear as real-life objects (although graphical objects are possible). The user would appear to be interacting with the object clusters. In this way, the example techniques may provide for a camera AR based interactive, personalized, and real-time video creation from existing videos.

In some examples, personal computing device 12 may generate information indicative of where the user is to be positioned for interaction with one or more object clusters. As one example, GPU 28 may generate image content that overlays an area where the user is to be positioned relative to the extracted one or more object clusters from the rendered one or more set of frames. Other ways of generating information indicative of where the user is to be positioned are possible.

Personal computing device 12 may be considered as performing the following example operations. The list of frames (e.g., set of frames 45) that personal computing device 12 receives or generates contains the IOCs (possibly as manipulated by network computing devices 18), and can be placed in live camera feed (either in screen space or in world space depending on campaign theme) allowing the user to interact with the IOC. In some examples, the user is first guided to position the camera and themselves relative to the IOC using an instruction overlay showing the floor space and where the user should stand relative to IOC. Once done, the user can record real-time videos with themselves interacting with the virtual IOCs placed next to them. Depending on the campaign context, additional visual effects can be built into the camera feed to drive awareness and association. Interaction support for AR friendly gestures etc. can be built in for ease of user.

Figure 3:
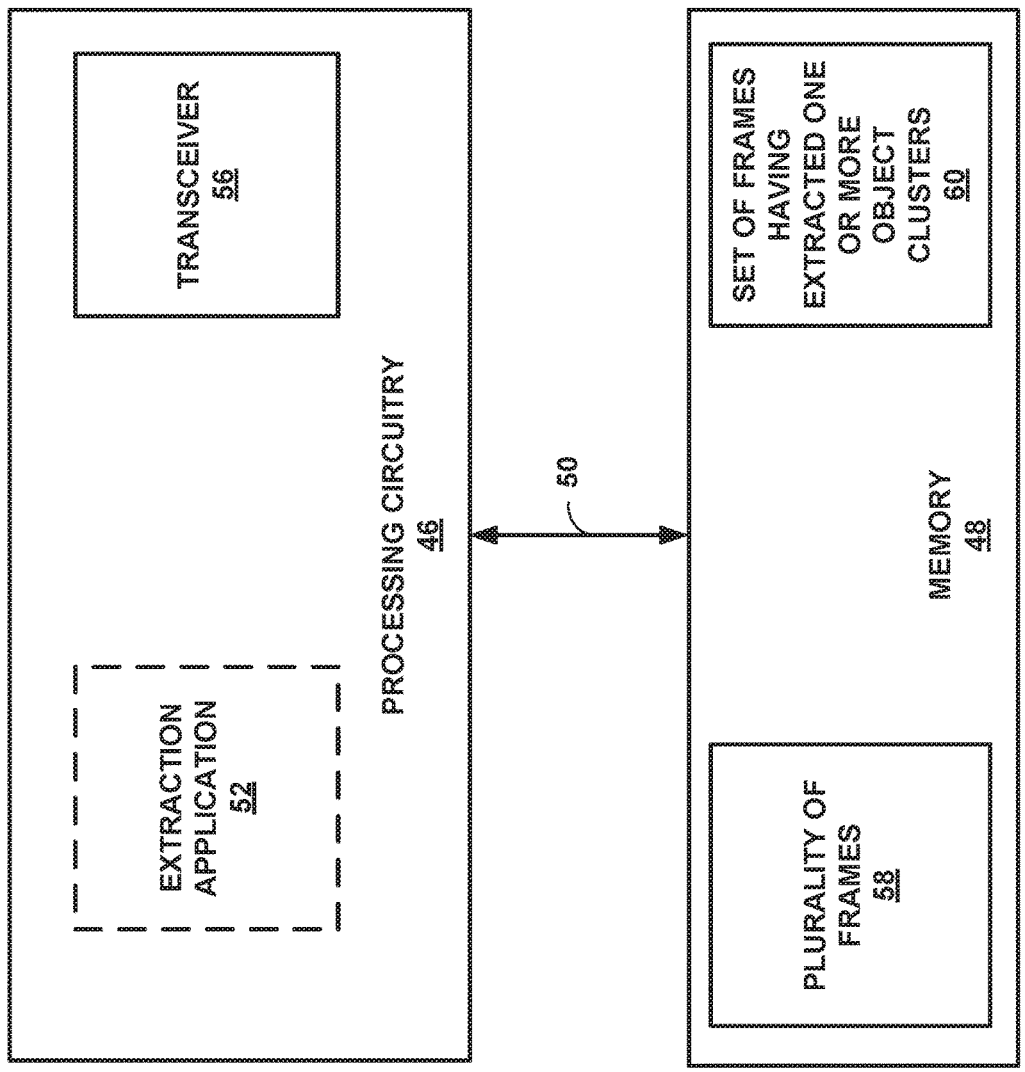
FIG. 3 is a block diagram illustrating an example of processing circuitry configured to extract object clusters in accordance with one or more example techniques described in this disclosure.

FIG. 3 is a block diagram illustrating an example of processing circuitry configured to extract object clusters in accordance with one or more example techniques described in this disclosure. FIG. 3 illustrates processing circuitry 46 and memory 48. Processing circuitry 44 and memory 48 may be distributed across one or more network computing devices 18 within cloud 16. In some examples, processing circuitry 46 and memory 48 may be the processing circuitry and memory of one of network computing devices 18. As described above, cloud 16 provides a computing infrastructure where operations are distributed across network computing devices 18. Accordingly, FIG. 3 may be considered as illustrating one or more network computing devices 18 that include processing circuitry 46 and memory 48.

For example, processing circuitry 46 is illustrated as executing extraction application 52. Transceiver 56 is circuitry with which processing circuitry 46 receives and transmits information. Also, memory 48 is illustrated as storing plurality of frames 58 and set of frames having extracted one or more object clusters 60. However, it may be possible, based on control of cloud 16 or workload of network computing devices 18 that one or more of the applications shown as executing on processing circuitry 46 execute on different network computing devices 18. Also, it may be possible that different network computing devices 18 each store some of the information shown to be stored in memory 48.

The example of FIG. 3 captures these various examples where processing circuitry 46 and memory 48 are distributed among one or more network computing devices 18. As illustrated, processing circuitry 46 and memory 48 communicate via communication channel 50. Communication channel 50 may be a bus, similar to bus 40 of FIG. 1. In some examples, communication channel 50 may be a packet-based network, such as a local area network, a wide-area network, or a global network such as the Internet.

Processing circuitry 46 may be formed as at least one of fixed-function or programmable circuitry such as in one or more microprocessors, ASICs, FPGAs, DSPs, or other equivalent integrated or discrete logic circuitry. Also, memory 48 may include one or more volatile or non-volatile memories or storage devices, such as, for example, RAM, SRAM, DRAM, ROM, EPROM, EEPROM, flash memory, a magnetic data media or an optical storage media.

Although the example of FIG. 3 shows applications executing on processing circuitry 46, the example techniques are not limited to any particular type of processing circuitry. In general, processing circuitry 46 may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Processing circuitry 46 may include arithmetic logic units (ALUs), elementary function units (EFUs), digital circuits, analog circuits, and/or programmable cores, formed from programmable circuits. In examples where the operations of processing circuitry 46 are performed using software executed by the programmable circuits, memory 48 may store the object code of the software that processing circuitry 46 receives and executes.

Plurality of frames 58 may be configured to store complete video content (e.g., full sequence of pictures). Extraction application 52 may be configured to determine one or more object clusters from a plurality of frames 58 of the video content. As described, at least one of the one or more object clusters is an object cluster with movement through the plurality of frames 58. Extraction application 52 may extract the determined one or more object clusters from the plurality of frames to generate a set of frames having extracted one or more object clusters 60 for storage in memory 48. Transceiver 56 may be configured to output the set of frames having extracted one or more object clusters (e.g., to personal computing device 12).

As described, in some examples, set of frames having extracted one or more object clusters 60 may have already been generated, such as where the video content is highly viewed. In some examples, processing circuitry 46 may execute extraction application 52 where memory 48 does not already store the desired set of frames having extracted one or more object clusters 60.

In some examples, to determine the one or more object clusters, processing circuitry 46 (e.g., via extraction application 52) may identify, with a convolutional neural network, the one or more object clusters and determine contours around the one or more identified object clusters. As one example, to identify the one or more object clusters, processing circuitry 46 may identify the one or more object clusters in an initial frame of the plurality of frames and propagate the identified one or more object clusters in the initial frame through remaining frames of the plurality of frames. As one example, to determine contours around the one or more identified object clusters, processing circuitry 46 may determine contours around the one or more identified object clusters in the initial frame of the plurality of frames and determine contours around the one or more identified object clusters in the remaining frames of the plurality of frames based on the propagation of the identified one or more object clusters in the initial frame through the remaining frames of the plurality of frames.

In some examples, to extract the determined one or more object clusters from the plurality of frames to generate the set of frames having extracted one or more object clusters, processing circuitry 46 may discard content other than the determined one or more object clusters from the plurality of frames to generate the set of frames having the extracted one or more object clusters. Moreover, in some examples, processing circuitry 46 may compress the set of frames having the extracted one or more object clusters. In such examples, outputting the set of frames includes transceiver 56 outputting the compressed set of frames.

Processing circuitry 46 (e.g., via execution of application 52) may be configured to perform the following example operations. Processing circuitry 46 extract out N number of frames from the input video's segment of interest (e.g., extract N frames from video content to generate plurality of frames 58). In some examples, the N frames to extract may be predefined by the brand creative team in-line with their existing campaign theme.

Processing circuitry 46 may process the initial frame through an Automated Segmentation Application which is a Convolutional Neural Network (CNN) trained to identify predefined objects and draw identification contours around the IOCs. Through an interactive object segmentation tool, processing circuitry 46 fine-tune the detected and undetected IOCs (although such operations of fine-tuning are not necessary in all examples). Once the fine tuning is done (if applicable), the detected segmentation is propagated automatically to detect IOCs in the following frames through a CNN module and extract the IOCs out. The list of frames (e.g., set of frames having extracted one or more object clusters 60) are stored as an image sequence for rendering purposes.

In some examples, processing circuitry 46 may apply video compression of frames to ensure responsive in-camera experience. For example, the frames from typical high-resolution video shoots are large in size. For a responsive in-camera experience, the file download size may be optimized as much as possible, while ensuring the visual experience quality is not impacted significantly. Existing techniques to reduce the file size of these frames may be used. For example, by selectively decreasing the number of colors in the image, there may be fewer bytes that are required to be stored. While keep the visual effect to minimal, the file size may be lowered (~70% reduction) per frame. In such examples, set of frames having extracted one or more object clusters 60 may be compressed frames.

Although not necessary, in some examples, processing circuitry 46 may perform some image manipulation. For instance, the list of frames (e.g., set of frames having extracted one or more object clusters 60) may now contain only the raw IOCs. In some examples, depending on the context, processing circuitry 46 may use Deep Learning (Generative Adversarial Networks, "GAN") to manipulate the frames to suite a requirement. For example, it may be possible to change the apparel worn by the celebrity in the input frame sequence (e.g., plurality of frames 58) to a live brand apparel (from a 2D apparel image) that the brand wants to promote as part of the campaign.

Figure 4:
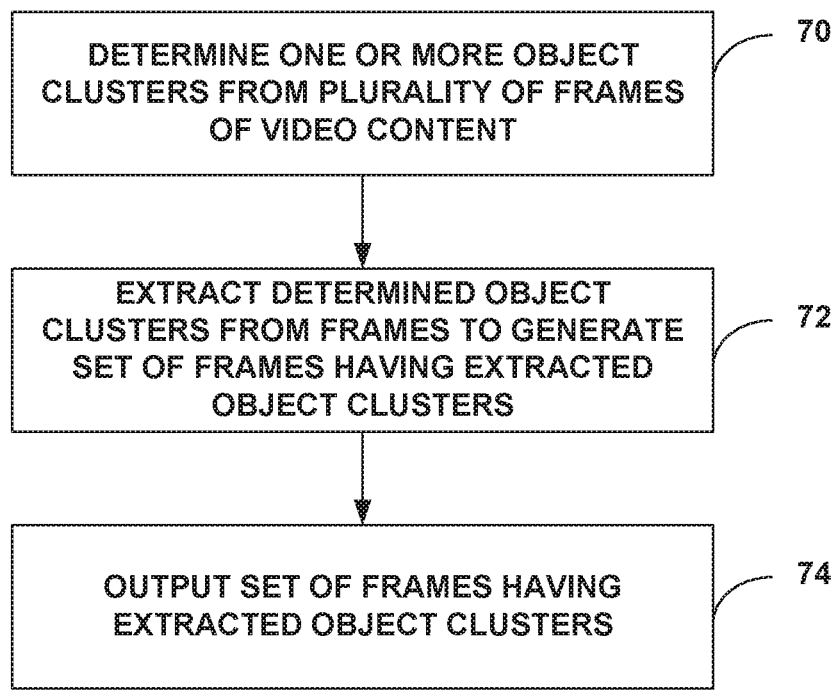
FIG. 4 is a flowchart illustrating an example of extracting object clusters in accordance with one or more example techniques described in this disclosure.
Figure 5A:
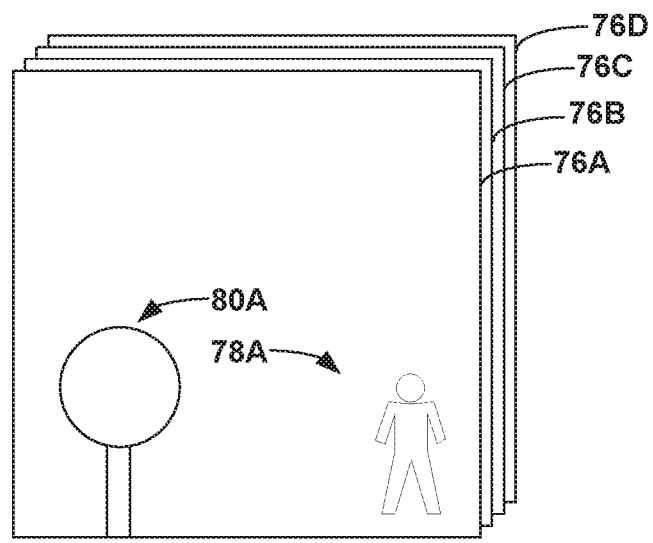
FIGS. 5A-5C are conceptual diagrams illustrating example of extracting object clusters in accordance with one or more example techniques described in this disclosure.
Figure 5B:
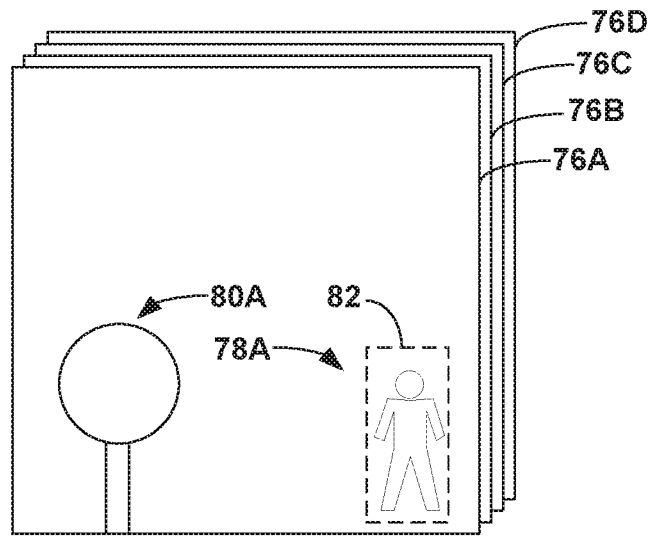
Figure 5C:
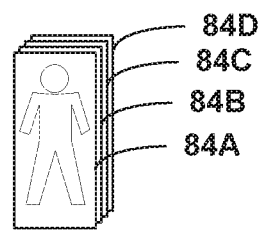

FIG. 4 is a flowchart illustrating an example of extracting object clusters in accordance with one or more example techniques described in this disclosure. For ease of description, FIG. 4 is described with respect to processing circuitry 46 of FIG. 3. However, it should be understood that the example techniques, although described with respect to FIG. 3 may be performed on personal computing device 12 of FIG. 2, or via some combination of processing circuitry 46 of FIG. 3 and personal computing device 12. Moreover, to assist with understanding, the example of FIG. 4 is described with reference to FIGS. 5A-5C. FIGS. 5A-5C are conceptual diagrams illustrating example of extracting object clusters in accordance with one or more example techniques described in this disclosure.

Processing circuitry 46 may be configured to determine one or more object clusters from a plurality of frames of video content (70). As an example, FIG. 5A illustrates frames 76A-76D, which are examples of plurality of frames 58 of FIG. 3. Each of frames 76A-76D may include one or more object clusters. For example, as illustrated, frame 76A includes object cluster 78A (e.g., a person) and object cluster 80A (e.g., a tree). Although not illustrated, each one of frames 76B-76D may similarly include respective object clusters (e.g., object cluster 78B-78D and object cluster 80B-80D).

In one or more examples, at least one of the one or more object clusters is an object cluster with movement through the plurality of frames 76A-76D. For example, object cluster 80A-80D may be static through frames 76A-76D. However, the person identified by object cluster 78A may move between frames 76A-76D (e.g., by dancing). Accordingly, the position of object clusters 78A-78D may be different relative to one another (e.g., different positions in the dance). In this example, object clusters 78A-78D may represent an object cluster with movement through frames 76A-76D. Although FIG. 5A illustrates two object clusters 78A and 80A, there may be many object clusters in frames 76A-76D, and processing circuitry 46 may determine any one or more of the object clusters.

There may be various ways in which processing circuitry 46 may determine object clusters 78A and 80A. As one example, a developer may select object cluster 78A in frame 76A, and processing circuitry 46 may determine object cluster 78A based on developer selection. As another example, the information used to generate frames 76A-76D may include metadata that identifies the location of object cluster 78A.

In some examples, as described above, to determine the one or more object clusters, processing circuitry 46 (e.g., via extraction application 52) may identify, with a convolutional neural network, the one or more object clusters and determine contours around the one or more identified object clusters. Processing circuitry 46 may identify the one or more object clusters (e.g., object cluster 78A) in initial frame 76A of the plurality of frames and propagate the identified one or more object clusters in the initial frame 76A through remaining frames 76B-76D of the plurality of frames 76A-76D. As one example, to determine contours around the one or more identified object clusters, processing circuitry 46 may determine contours around the one or more identified object clusters in frame 76A and determine contours around the one or more identified object clusters in the remaining frames 76B-76D based on the propagation of the identified one or more object clusters in the initial frame 76A through the remaining frames 76B-76D.

Processing circuitry 46 may extract determined object clusters from the plurality of frames to generate set of frames having extracted object clusters (72). As one example, processing circuitry 46 may execute extraction application 52 to extract the determined object clusters.

For example, as illustrated in FIG. 5B, processing circuitry 46 may determine a bounding box 82 around object cluster 78A. Although not shown, there may be bounding box 82 around each of object clusters 78B-78D in frames 76A-76D. In examples where object cluster 78A is moving locations between frames 76A-76D, the location of bounding box 82 may similarly move to cover object clusters 78B-78D.

Processing circuitry 46 may extract the image content within bounding box 82 to generate set of frames 84A-84D, of FIG. 5C, having extracted object clusters. Frames 84A-84D are examples of set of frames having one or more object clusters 60 of FIG. 3.

In some examples, to extract the determined one or more object clusters from the plurality of frames to generate the set of frames having extracted one or more object clusters, processing circuitry 46 may discard content other than the determined one or more object clusters from the plurality of frames 76A-76D to generate the set of frames 84A-84D having the extracted one or more object clusters.

Processing circuitry 46 may output set of frames having extracted object clusters (74). For example, processing circuitry 46 may cause transceiver 56 to output frames 84A-84D for personal computing device 12 to eventually receive and process.

Figure 6:
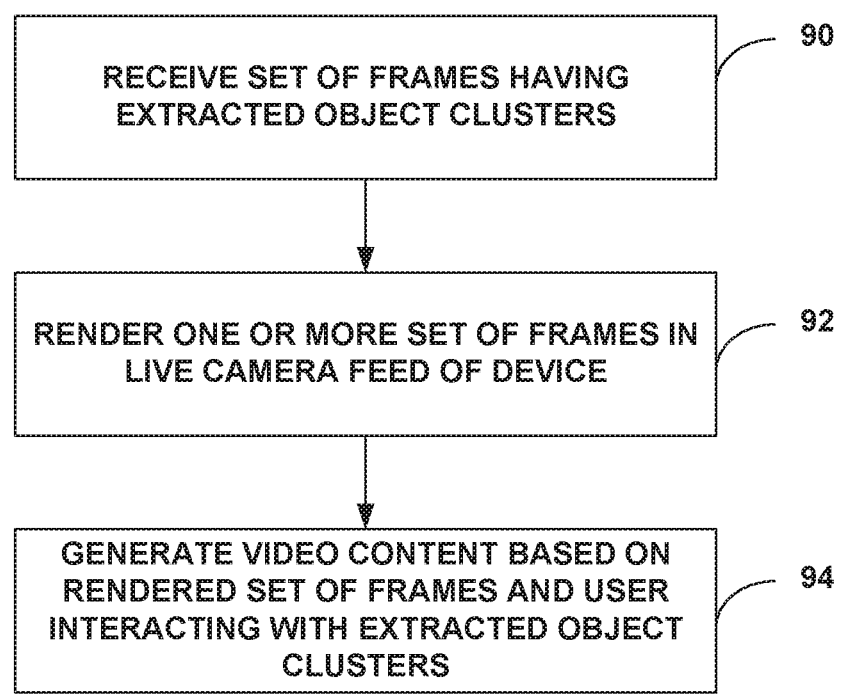
FIG. 6 is a flowchart illustrating an example of generating video content in accordance with one or more example techniques described in this disclosure.
Figure 7A:
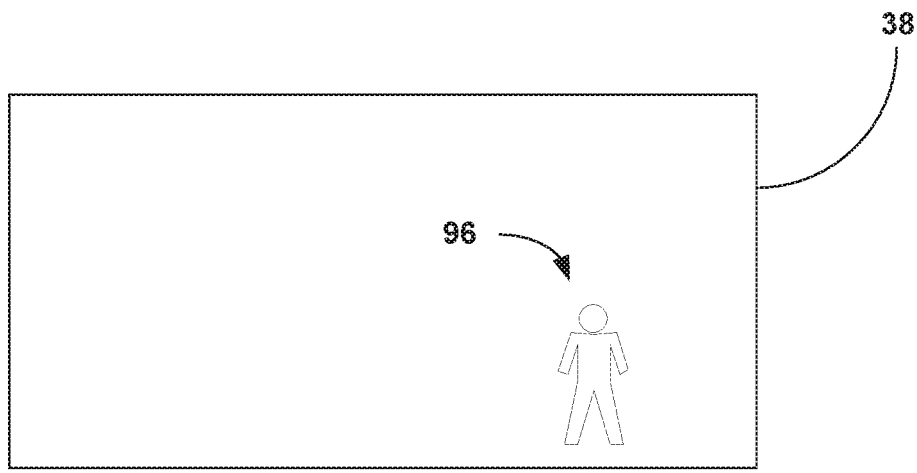
FIGS. 7A and 7B are conceptual diagrams illustrating example of generating video content in accordance with one or more example techniques described in this disclosure.
Figure 7B:
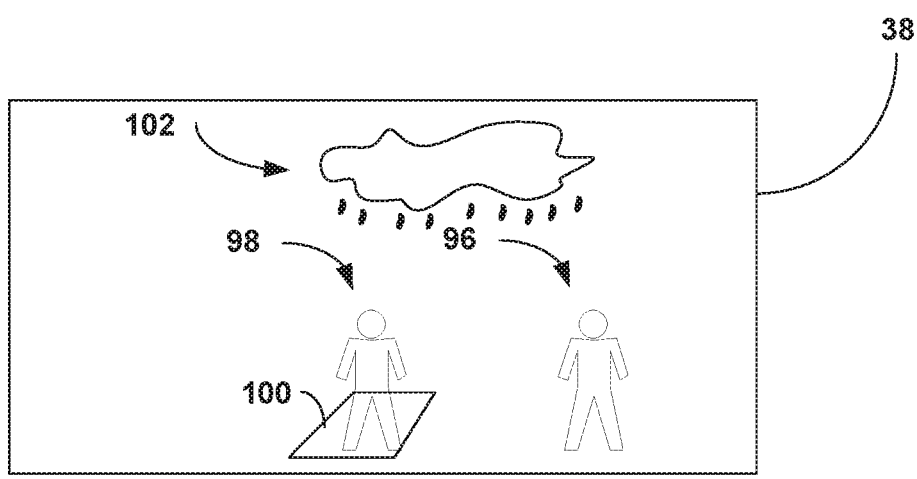

FIG. 6 is a flowchart illustrating an example of generating video content in accordance with one or more example techniques described in this disclosure. For ease of description, FIG. 6 is described with respect to processing circuitry of personal computing device 12 of FIG. 2, where examples of the processing circuitry include one or more of CPU 24, GPU 28, and video processor 39, as well as other example components of personal computing device 12. However, it should be understood that the example techniques, although described with respect to FIG. 2 may be performed by processing circuitry 26 of FIG. 3, or via some combination of processing circuitry 46 of FIG. 3 and personal computing device 12. Moreover, to assist with understanding, the example of FIG. 6 is described with reference to FIGS. 7A and 7B. FIGS. 7A and 7B are conceptual diagrams illustrating example of generating video content in accordance with one or more example techniques described in this disclosure.

The processing circuitry of personal computing device 12 may receive a set of frames having extracted one or more object clusters (90). For example, CPU 24 may receive frames 84A-84D of FIG. 5C that include object cluster 78 for storage in memory 32. For instance, frames 84A-84D may be an example of set of frames 45 of FIG. 2. As described above, in general, the one or more clusters that are in the set of frames received by personal computing device 12 are extracted from a plurality of frames (e.g., frames 76A-76D of FIG. 5A). Also, at least one of the one or more object clusters is an object cluster with movement through the plurality of frames. For instance, as described above with respect to FIG. 5A, object cluster 78A may represent a person that is dancing, and therefore, there is movement of object cluster 78A through frames 76A-76D (e.g., position and/or location of object cluster 78A is different than position and/or location of object cluster 78B, which is different than position and/or location of object cluster 78C, and so forth).

The processing circuitry of personal computing device 12 may render one or more of the set of frames in a live camera feed of personal computing device 12 (92). For example, as illustrated in FIG. 7A, personal computing device 12 may be in a live camera feed mode where a user desires to take a video. For instance, FIG. 7A illustrates display 38, and display 38 may be displaying image content that is captured by sensor 20 and camera processor 22. Then, video processor 39 and/or GPU 28 may render frames 84A-84D in the live camera feed. For instance, FIG. 7A illustrates object cluster 96 which is an example instance of one of object clusters 78A-78D.

The processing circuitry may generate video content based on the rendered one or more set of frames and a user interacting with the extracted one or more object clusters (94). For example, as illustrated in FIG. 7B, the user of personal computing device 12 may ask a friend (e.g., person 98) to enter the live camera feed so that sensor 20 and camera processor 22 capture the friend (e.g., generate image content of the friend for display). As another example, the user of personal computing device 12 may put personal computing device 12 on a stand and enter the live camera feed. In either example, the user or the friend is an example of a user (e.g., person 98) that is interacting with the extracted one or more object clusters (e.g., object cluster 96). For instance, person 98 may dance with object cluster 96, may act like he or she is having a conversation with object cluster 96, and so forth.

In some examples, to generate the video content, the processing circuitry may display, as part of the live camera feed, the rendered one or more set of frames and the user interacting with the extracted one or more object clusters (e.g., as illustrated in FIG. 7B). In some examples, in addition to or instead of displaying, to generate the video content, the processing circuitry may generate a recording of the rendered one or more set of frames and the user interacting with the extracted one or more object clusters.

In some examples, the processing circuitry (e.g., via GPU 28) may generate information indicative of where the user is to be positioned for interaction with the one or more object clusters. For instance, GPU 28 may render a graphical box 100. Person 98 may move within the live camera feed until person 98 is located within graphical box 100. For instance, graphical box 100 may be image content that overlays an area where person 98 is to be positioned relative to the extracted one or more object clusters 96 from the rendered one or more set of frames 84A-84D. In examples where the processing circuitry generates information indicative of where the user is to be positioned, the processing circuitry may generate video content based on the rendered one or more set of frames 84A-84D and the user (e.g., person 98) interacting with the extracted one or more object clusters (e.g., object cluster 96) at a position based on the generated information indicative of where the user is to be positioned (e.g., graphical box 100).

As described, the processing circuitry may render one or more of the set of frames in the live camera feed. However, to ensure that the rendering appears realistic, the processing circuitry may need to scale the one or more set of frames. For instance, without scaling the one or more object clusters may appear to be too big relative to person 98 or may appear further back or in front of person 98.

Accordingly, in some examples, the processing circuitry may determine at least one of a size and relative depth of the user (e.g., person 98) in the live camera feed (e.g., based on graphical box 100 as one example). The processing circuitry may scale the extracted one or more objects (e.g., object 96) based on at least one of the determined size and relative depth of the user to generate a scaled set of frames. The processing circuitry may render one or more of the scaled set of frames.

There may be various way is in which the processing circuitry may scale. As one example, the processing circuitry may utilize plane tracking. In plane tracking, the floor in the user environment is detected from the camera feed and then the extracted object cluster is placed in life-size form on the detected floor. As another example, the processing circuitry may utilize world space scaling. In world space scaling, the extracted object cluster is placed in the user environment via the camera feed and the user has the ability to scale it appropriately in order to place it wherever they want.

In some examples, a user may desire to add animation. For example, the user may wish to add animation that shows that the user and object cluster are dancing in the rain. Accordingly, in some examples, the processing circuitry may render animation with one or more set of frames in the live camera feed. For instance, FIG. 7B illustrates animation 102, which is an animation rendered by GPU 28 of rain. The processing circuitry may generate the video content based on the rendered one or more frames, the rendered animation, and the user interacting with the extracted one or more object clusters.

The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, DSPs, ASICs, FPGAs, or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as RAM, ROM, non-volatile random access memory (NVRAM), EEPROM, FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

What is claimed is:

1. A method of processing video content, the method comprising:
  receiving a set of frames having extracted one or more object clusters, wherein the one or more object clusters are extracted from a plurality of frames, wherein at least one of the one or more object clusters is an object cluster with movement through the plurality of frames;
  rendering one or more of the set of frames in a live camera feed of a device;
  generating information indicative of a position where a user is to be positioned in video content, that is subsequently generated, for interaction with the one or more object clusters, wherein the user is not interacting with the one or more object clusters in the received set of frames; and
  generating the video content based on the rendered one or more set of frames and the position where the user is to be positioned for interacting with the extracted one or more object clusters, wherein the generated video content includes both the extracted one or more object clusters and the user at the position.

2. The method of claim 1, wherein generating the information indicative of the position where the user is to be positioned for interaction with the one or more object clusters comprises generating image content that overlays an area where the user is to be positioned relative to the extracted one or more object clusters from the rendered one or more set of frames.

3. The method of claim 1, wherein generating the video content comprises:
  displaying, as part of the live camera feed of the device, the rendered one or more set of frames and the user interacting with the extracted one or more object clusters.

4. The method of claim 1, wherein generating the video content comprises:
  generating a recording of the rendered one or more set of frames and the user interacting with the extracted one or more object clusters.

5. The method of claim 1, wherein rendering one or more of the set of frames in the live camera feed comprises:

determining at least one of a size and relative depth of the user in the live camera feed;
scaling the extracted one or more object clusters based on at least one of the determined size and relative depth of the user to generate a scaled set of frames; and
rendering one or more of the scaled set of frames.

6. The method of claim 1, further comprising:
rendering animation with the one or more set of frames in the live camera feed of the device,
wherein generating the video content comprises generating the video content based on the rendered one or more set of frames, the rendered animation, and the user interacting with the extracted one or more object clusters.

7. A device for processing video content, the device comprising:
a memory configured to store a set of frames having extracted one or more object clusters; and
processing circuitry, coupled to the memory, and configured to:
receive a set of frames having extracted one or more object clusters, wherein the one or more object clusters are extracted from a plurality of frames, wherein at least one of the one or more object clusters is an object cluster with movement through the plurality of frames;
render one or more of the set of frames in a live camera feed of a device;
generate information indicative of a position where a user is to be positioned in video content, that is subsequently generated, for interaction with the one or more object clusters, wherein the user is not interacting with the one or more object clusters in the received set of frames; and
generate the video content based on the rendered one or more set of frames and the position where the user is to be positioned for interacting with the extracted one or more object clusters, wherein the generated video content includes both the extracted one or more object clusters and the user at the position.

8. The device of claim 7, wherein to generate information indicative of the position where the user is to be positioned for interaction with the one or more object clusters, the processing circuitry is configured to generate image content that overlays an area where the user is to be positioned relative to the extracted one or more object clusters from the rendered one or more set of frames.

9. The device of claim 7, wherein to generate the video content, the processing circuitry is configured to:
display, as part of the live camera feed of the device, the rendered one or more set of frames and the user interacting with the extracted one or more object clusters.

10. The device of claim 7, wherein to generate the video content, the processing circuitry is configured to:
generate a recording of the rendered one or more set of frames and the user interacting with the extracted one or more object clusters.

11. The device of claim 7, wherein to render one or more of the set of frames in the live camera feed, the processing circuitry is configured to:
determine at least one of a size and relative depth of the user in the live camera feed;
scale the extracted one or more object clusters based on at least one of the determined size and relative depth of the user to generate a scaled set of frames; and
render one or more of the scaled set of frames.

12. The device of claim 7, wherein the processing circuitry is configured to:
render animation with the one or more set of frames in the live camera feed of the device,
wherein to generate the video content, the processing circuitry is configured to generate the video content based on the rendered one or more set of frames, the rendered animation, and the user interacting with the extracted one or more object clusters.

13. The device of claim 7, wherein the device comprises a wireless communication device.

14. A computer-readable storage medium storing instructions thereon that when executed cause one or more processors to:
receive a set of frames having extracted one or more object clusters, wherein the one or more object clusters are extracted from a plurality of frames, wherein at least one of the one or more object clusters is an object cluster with movement through the plurality of frames;
render one or more of the set of frames in a live camera feed of a device;
generate information indicative of a position where a user is to be positioned in video content, that is subsequently generated, for interaction with the one or more object clusters, wherein the user is not interacting with the one or more object clusters in the received set of frames; and
generate the video content based on the rendered one or more set of frames and the position where the user is to be positioned for interacting with the extracted one or more object clusters, wherein the generated video content includes both the extracted one or more object clusters and the user at the position.

15. The computer-readable storage medium of claim 14, wherein the instructions that cause the one or more processors to generate information indicative of the position where the user is to be positioned for interaction with the one or more object clusters comprise instructions that cause the one or more processors to generate image content that overlays an area where the user is to be positioned relative to the extracted one or more object clusters from the rendered one or more set of frames.

16. The computer-readable storage medium of claim 14, wherein the instructions that cause the one or more processors to generate the video content comprise instructions that cause the one or more processors to:
display, as part of the live camera feed of the device, the rendered one or more set of frames and the user interacting with the extracted one or more object clusters.

17. The computer-readable storage medium of claim 16, wherein the instructions that cause the one or more processors to generate the video content comprise instructions that cause the one or more processors to:
generate a recording of the rendered one or more set of frames and the user interacting with the extracted one or more object clusters.

* * * * *